Aug. 20, 1957          G. S. McLAY          2,803,154
MANUFACTURE OF METAL HOLLOWS AND APPARATUS THEREFOR
Filed May 11, 1953          3 Sheets-Sheet 1
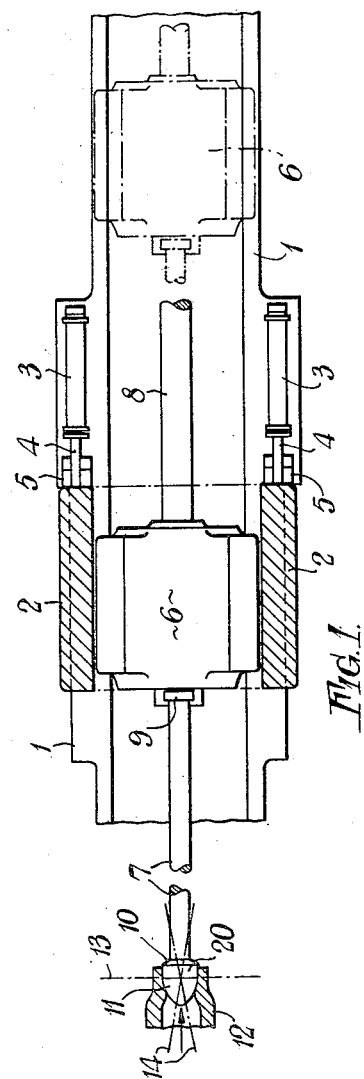
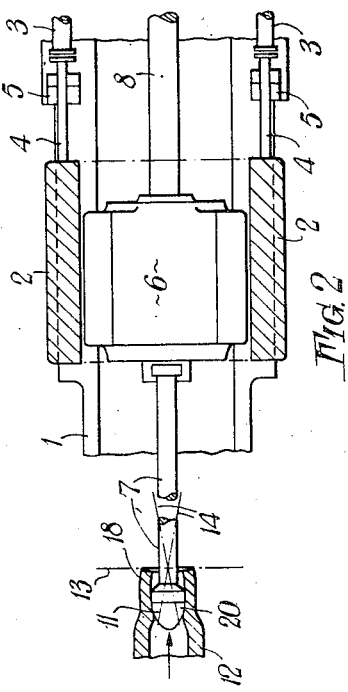
Inventor
Gavin Smellie McLay
By Peck & Peck
Attorneys Aug. 20, 1957  G. S. McLAY  2,803,154
MANUFACTURE OF METAL HOLLOWS AND APPARATUS THEREFOR
Filed May 11, 1953  3 Sheets-Sheet 2

Inventor
Gavin Smellie McLay
By Peck & Peck
Attorneys

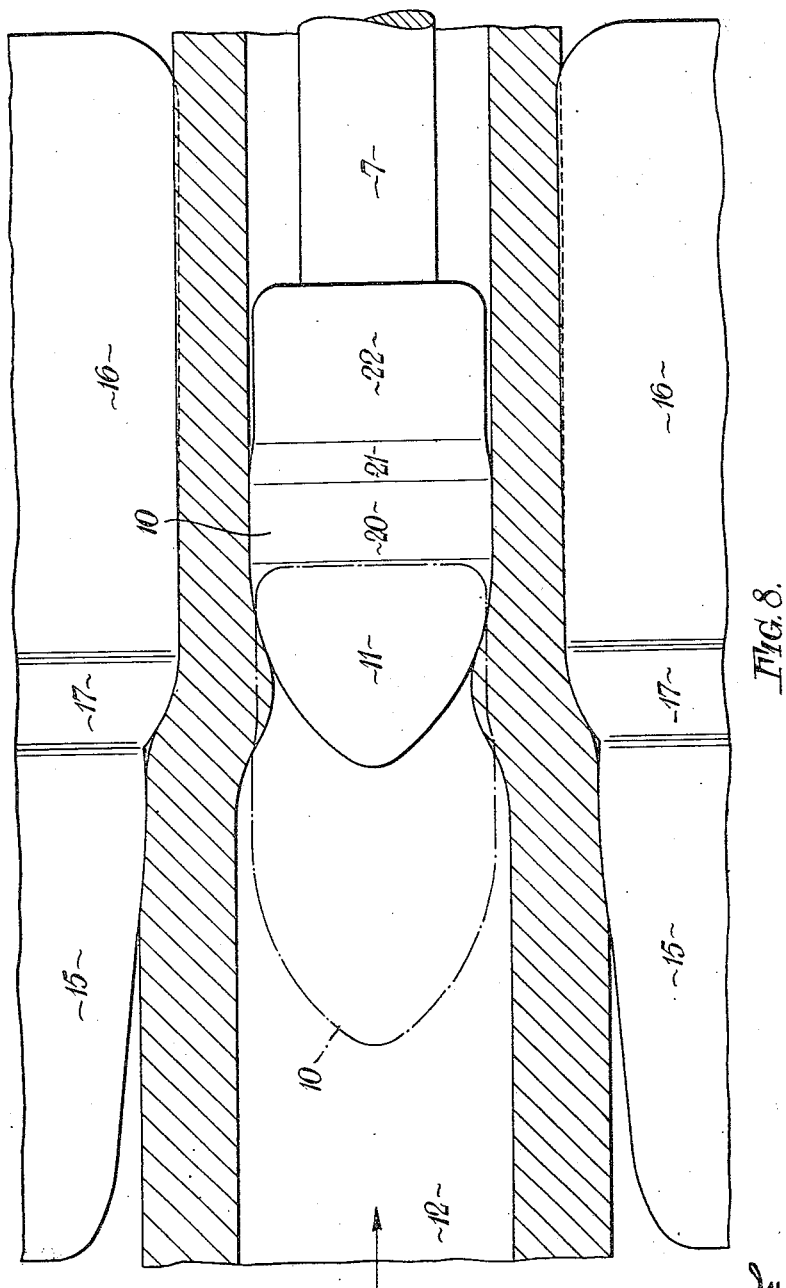

United States Patent Office 2,803,154
Patented Aug. 20, 1957

2,803,154

MANUFACTURE OF METAL HOLLOWS AND APPARATUS THEREFOR

Gavin Smellie McLay, London, England, assignor to Stewarts and Lloyds Limited, Glasgow, Scotland, a company of Great Britain Application May 11, 1953, Serial No. 354,355

2 Claims. (Cl. 80—62)

This invention relates to a method of manufacture of metal hollows more particularly, though not exclusively, of steel and to apparatus for making these hollows.

The apparatus according to the invention is of the kind (hereinafter referred to as of "the kind described") comprising two or more rolls, one at least of which is driven, with their axes inclined to one another so that when a cylindrical work piece is entered between them they exert a radial pressure on and rotate the work piece and drive it forward, and a somewhat conical shaped plug positioned between the rolls and over which the work piece is fed, said plug being carried on a thrust bar usually, and herein, called a plug bar and the rolls each having end parts substantially of cylindrical or taper form, or one substantially taper and the other substantially cylindrical, joined by a somewhat frusto-conical surface contour. As is well known, rolls as thus defined, operate on the skew-rolling principle and they will be hereinafter referred to as skew rolls. They are operative to cause the work-piece to be increased in length by their operation and if the work-piece is solid when fed to the rolls it is pierced and converted to a tubular hollow. The apparatus is then called a piercing mill, but if the work piece is already a hollow, either with one end closed or both ends open the apparatus is called an elongator.

Metal hollows produced by the method according to the present invention are intended for treatment in a further apparatus having driven rolls, such as a pilger mill or an apparatus having through passes between grooved rolls some or all of which may be driven.

According to this invention, a method of producing a metal hollow in apparatus of the kind described, comprises first subjecting the work-piece to the action of the skew rolls when the plug is in one position with respect to and adjacent the somewhat frusto-conical surface contour of the rolls and thereafter moving the plug longitudinally to another position with respect to and adjacent that surface contour and further subjecting the work-piece to the action of the rolls with the plug in the latter position.

This method may be applied to various ends in the production of metal hollows particularly those to be used for the manufacture of seamless metal tubes. Thus, for example, it facilitates efficient entry into engagement with the plug of work-pieces from which the hollows are to be formed and, after the initial engagement, the subsequent working of the work-piece in a longitudinally adjusted position of the plug, may be improved or subject to more efficient control. A particularly important advantage is that the method enables the hollows to be efficiently subjected to operations for constricting them in their end regions so that when such a hollow is placed on a mandrel for subsequent treatment in the further apparatus referred to it will have contact with the mandrel only at the constrictions with advantages such as will be hereinafter described.

The limitations to be placed on the longitudinal movement of the plug will depend on the conditions obtaining.

In practice also, the shape of the plug, while retaining the somewhat conical shape, may require to be varied, or the somewhat frusto-conical roll surface contour may be desired to be modified though keeping to the same general form, all according to the size and quality of the workpiece to be dealt with. Moreover, the rolls may require to be set at a small angle say between 2° and 6° to the horizontal according to the amount of work to be done depending on the size of the work-piece and the thickness of the hollow required and this affects the limitations to which reference has been made. It will be realised, however, that according to the conditions, the plug, by appropriate longitudinal adjustment thereof from one position to another, may be given the most favourable settings for problems in hand so that desirable versatility attaches to the applications of the invention.

According to another feature of the invention, a method of producing a metal hollow comprises treating a work-piece in an apparatus of the kind described while the plug is so disposed between the skew rolls that its apex is positioned opposite or slightly in front of the front end of the somewhat frusto-conical surface contour of the rolls and, when the leading end of the work-piece has passed the plug, moving the latter in the direction opposite to the travel of the work-piece to a position in which the somewhat conical surface of the plug is substantially entirely in front of the frusto-conical surface contour of the rolls, retaining the plug in this position while performing an operation by the somewhat frusto-conical surface contour of the rolls on the leading end part of the work-piece and, when this operation is completed, returning the plug to its initial position and maintaining the plug in the latter position until the work-piece has passed the plug or substantially so.

According to a further feature of the present invention, a method of producing a metal hollow comprises treating a work-piece in an apparatus of the kind described while the plug is so disposed between the skew rolls that its apex is positioned opposite or slightly to the rear of the somewhat frusto-conical surface contour of the rolls and, when the leading end of the work-piece has passed the plug, moving the latter in the direction opposite to the travel of the workpiece to a position in which the apex of the plug is in front of the somewhat frusto-conical surface contour of the rolls, maintaining the plug in this position until the back end of the work-piece is approaching the apex of the plug, then moving the latter in the same direction as the travel of the work-piece to the first position and maintaining it in this position until the work-piece has passed the plug or substantially so.

According to another method feature of the invention, after movement of the plug from an initial position in the direction opposite to the travel of the work-piece and closely after the leading end of the work-piece has passed the plug, such end of the work-piece is subjected to an operation to constrict the work-piece in diameter at a point at or near such leading end.

Under another method feature of the invention, the back end of the work-piece closely after passing the plug is subjected to an operation to constrict the work-piece in diameter at a point at or near such back end.

According to a further feature of the present invention, an apparatus for producing metal hollows comprises a plurality of skew rolls as above defined, a support engageable with a plug bar and movable in the axial direction of such bar to adjust a plug or said bar between said rolls, and means for determining the adjustment of said support in such a manner that the plug can be moved longitudinally from one position with respect to and adjacent the somewhat frusto-concial surface contour of the skew rolls to another position with respect to and adjacent that surface contour.

One particular form of such apparatus is constructed for adjustment of the said support in such a manner that the plug is movable longitudinally from a position in which its apex is opposite or slightly in front of the front end of the somewhat frusto-conical surface contour of the skew rolls to a position in which the somewhat conical surface of the plug is substantially entirely in front of said frusto-conical surface contour of such rolls, and vice versa.

In another particular form, the apparatus is constructed for adjustment of said support in such a manner that the plug is movable longitudinally from a position in which its apex is opposite or slightly to the rear of the somewhat frusto-conical surface contour of the skew rolls to a position in which the apex of the plug is in front of said surface contour of such rolls, and vice versa.

The two particular forms of apparatus are considered to provide for advantageous carrying out of useful operations on the work-piece but it will be apparent that other particular forms of the apparatus may be constructed within the scope of the present improvements in or relating to the manufacture of metal hollows.

In order to enable the invention to be readily understood reference is directed by way of example to the accompanying drawings in which:

Figure 1 is a plan view, partly in section, illustrating one form of apparatus according to the invention and showing it as it is during one phase of its operations.

Figures 2 and 3 are similar views depicting further steps in the operation of the apparatus.

Figure 3:
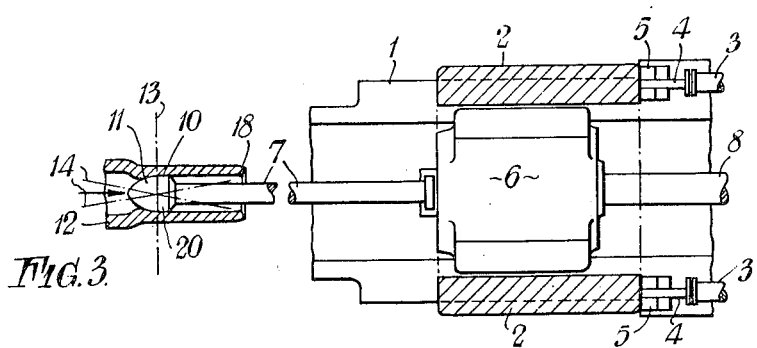
Figure 4:
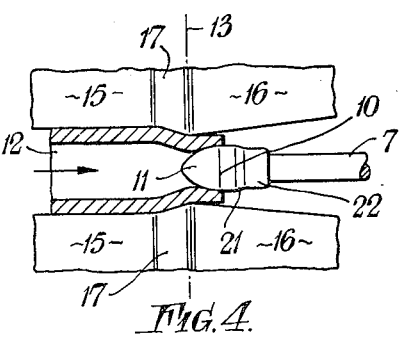
Figure 5:
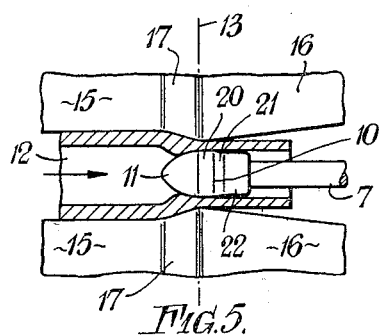
Figure 6:
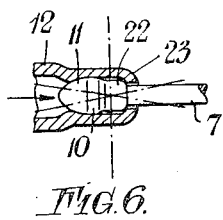
Figure 7:
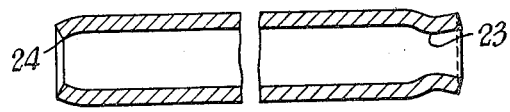

Figure 4 is a fragmental plan illustraing another form of apparatus of the invention during one phase of its operation, Figure 5 is a similar view illustrating a succeeding stage in the operation of the skew rolls on the work-piece, Figure 6 illustrates a modification, Figure 7 is a central longitudinal section of one form of hollow produced by apparatus according to the invention, and Figure 8 is a fragmentary longitudinal sectional view, to a larger scale than Figures 1 to 7, showing a modified construction of the rolls of the apparatus and giving a somewhat clearer indication of the nature of the operation of the skew rolls.

In Figures 1 to 3, there is mounted on the bed 1 of the apparatus a hollow casting 2 e. g. of bridge form shown in horizontal section through the legs of the bridge. The casting is slidable in the bed 1 by operation of fluid-pressure cylinders 3 of which the co-operative pistons 4 are connected to the casting. Stops 5 on the bed determine the limit of withdrawal of the bridge casting, i. e. to the right in the drawings. There is also mounted on the bed 1 a support 6 for the plug bar 7. This support is also slidable on the bed 1 and can be moved from a retracted position, such as is shown in dot-and-dash lines in Figure 1, to a position within and between the legs of the bridge casting 2 and then locked in that position to this casting. The part 8 is a shaft for advancing and withdrawing the support 6 on the bed 1. The plug bar 7 is connectible and disconnectible from the support 6, or thrust block as it may be termed, at 9 and at its forward end carries the plug 10. The latter, as shown, is of somewhat conical shape at 11 after usual manner and at the commencement of operations on the work-piece 12 (Figure 1), may be situated so that the apex of the somewhat conical shape substantially lies opposite or slightly in front of the front end of the somewhat frusto-conical surface contour 17 (hereafter referred to) of the skew rolls, cf. Figure 8. The skew rolls (usually two in number, one on one side and one on the other side of the plug bar axis), are omitted from Figures 1 to 3 so as to enable the operations on the blank to be clearly shown but they are represented by their axes 14 shown in dot-and-dash lines and which in elevation cross at a small angle to each other on the centre line 13, of the rolls.

Appropriate forms of the skew rolls are shown in Figures 4 and 5 but their form may vary so long as their end parts 15, 16 are constructed and joined by a part 17 of somewhat frusto-conical surface contour within the definition of skew rolls already given above.

In Figures 4 and 5, the end parts 15, 16 are shown of cylindrical and taper shape respectively, while in Figure 8, substantially similar shapes are shown but in reverse order. The end parts 15, 16, however, may both be cylindrical or both taper and usually, though not always, these end parts are of different diameters. One form of the somewhat frusto-conical surface contour of the rolls is seen in Figures 4 and 5 and another form in Figure 8, but in practice the shape at 17 though retaining generally the somewhat frusto-conical surface contour may be subjected to modification by the operating staff according to the size and quality of the work-piece being dealt with. Similar considerations apply to the plug 10 so long as the somewhat conical shape of it at 11 is retained. The skew rolls may be set in elevation at any angle between 2° and 6° to the axes of the plug 10 according to the amount of work involved depending on the size of the work-piece and the thickness of the hollow required. It will be apparent that a slight inclination of the rolls in this sense is shown in Figure 8.

In the operation of the apparatus shown in Figures 1 to 3, the heated work-piece 12 is fed to the skew rolls co-axially with the plug. At the commencement of the operations on the work-piece, the bridge casting 2 is retracted against the stops 5 with the support or thrust block 6 locked thereto so that the plug is situated as above stated, see Figure 1. The work-piece is tubular and of larger external diameter than the hollow to be formed, and when it is fed to the skew rolls it is caused by the part 17 of the rolls to be "waisted" down on to the somewhat conical shaped part 11 of the plug cf. Figure 8. Elongation of the work-piece thus commenced, with the plug 10 in the position of Figure 1, now proceeds until the leading end of the work-piece has passed the plug. The cylinder and piston devices 3, 4 are then operated under appropriate control to advance the sliding bridge casting 2 and the support 6, locked thereto, to the position shown in Figure 2. In this operation, the plug 10 is moved in the direction opposite to the travel (shown by the arrow) of the work-piece, taking the latter with it, the movement being, of the order, say, of approximately six inches. This brings the plug to a position, shown in Figure 2, in which its part 11 of somewhat conical shape is substantially entirely forward of the frusto-conical surface contour 17 of the skew rolls. This position may, for example, be similar to that shown in dot-and-dash lines in Figure 8 though in that figure the plug is of a somewhat different shape at the rear as will be hereinafter referred to. The part 17 of the skew rolls now noses down the leading end of the work-piece behind the plug as indicated at 18 in Figure 2, resulting in a constriction of the diameter of the work-piece substantially as shown. The nosing down at 18 being completed, the cylinders 3 are connected to exhaust under appropriate control with the result that the thrust from the skew rolls returns the support 6 and the sliding bridge casting 2 to the initial position shown in Figure 3. The elongation of the work-piece 12 now continues with the plug 10 in similar position to that shown in Figure 1. As will be realised, the skew rolls exert a radial pressure on the work-piece and, operating on the skew rolling principle, cause it to be carried forward on the plug and spread out lengthwise so as to increase its length. Just shortly before the back end of the work-piece passes the plug, the latter is moved forward again to the position shown in Figure 2. The work-piece, of course, again partakes of this movement, and just as the skew rolls complete their forward thrust on the workpiece and cause it substantially to pass the plug, the part 17 of the rolls constricts the back end of the hollow around the plug bar 7 in similar manner to the leading end though, of course, in the reverse sense, cf. the left-hand end of the hollow shown in Figure 7. The completed hollow is now removed with the plug and plug bar in it for subsequent operations, in which, of course, the plug and plug bar would, if necessary, be removed. The support 6 may be unlocked from the bridge casting 2 and retracted, e. g. to the dot-and-dash line position shown in Figure 1, when the hollow is removed as stated. The subsequent operations in the present instance are preferably effected in a further apparatus having driven rolls as already referred to, and in the use of which the hollow made with constrictions as described would be treated while on a mandrel. A satisfactory constriction amounts to ½" to 1½" at the leading end of the hollow and ¼" to 1¼" at the back end, these amounts referring to the internal diameter of the major part of the length of the hollow and the internal diameter of the constricted portions. When such a hollow is to be treated on a mandrel in a further apparatus having driven rolls, to convert it into a still longer and thinner hollow or tube, it has the advantage that there is contact only between it and the mandrel at its ends so that the heat transfer from it to the mandrel is a minimum. This results, inter-alia, in the following advantages:

(1) A minimum of change of mandrel diameter due to heat growth during the subsequent treatment and thus a more dimensionally accurate, and so a better quality of, tubular product.

(2) A longer working life of the mandrel which reflects in a more cheaply produced tubular product.

(3) A bent mandrel may be used in the subsequent treatment since the hollow is maintained generally concentric with the mandrel at the small surfaces of intimate contact at the ends of the hollow.

(4) A bent mandrel may be threaded into the hollow without undue force being necessary, since there is sufficient space between the restricted internal diameters of the hollow to enable the bent mandrel to be accommodated without contacting the hollow.

(5) The entry of the hollow between the rolls of the further apparatus used for the subsequent treatment is greatly facilitated.

In the apparatus shown in Figures 4 and 5 parts which are similar to those shown in Figures 1 to 3 are similarly numbered. The apparatus differs from that described with reference to Figures 1 to 3 in that the plug is operative in different positions and is of somewhat different construction.

At first, and as shown in Figure 4, the plug 10 is positioned between the skew rolls with the apex of its somewhat conical part 11 positioned opposite (or, may be, slightly to the rear of) the somewhat frusto-conical surface contour of the rolls at 17. As before, the rolls exert a radial pressure on the work-piece 12 and operating on the skew-rolling principle cause it to be carried forward over the plug and spread out lengthwise so as to increase its length. Shortly after the leading end of the work-piece has passed the plug, the latter is moved axially in the direction opposite to the travel of the work-piece to a position shown in Figure 5, in which the apex of the somewhat conical part 11 of the plug is in front of the somewhat frusto-conical surface contour of the skew rolls. The plug is maintained in this position until the back end of the work-piece is about 6" from the aforesaid apex when the plug 10 is moved to its first position and maintained there until the work-piece has passed the plug.

The hollow produced by the apparatus of Figures 4 and 5 is shown without constriction of its leading end and there need be no constriction of its back end. A very efficient production, however, can be achieved, the first position of the plug facilitating the entry of the work-piece and the advanced position of the plug providing for desirable compacting of the metal of the hollow between the plug and the rolls and a nice control of the thinning down of the wall of the work-piece at the forward end of the part 17 of the rolls.

As already indicated, the shape of the plug may be varied according to the nature of the work in hand. In the drawings, the somewhat conical shape at 11 is shown followed by a short cylindrical part 20 which is useful in controlling the internal contour of the hollow. After a short somewhat frusto-conical reduction 21 to the rear of the part 20, there may or may not be a further portion 22 of cylindrical shape rounded off at the ends, compare Figures 4, 5, 6 and 8 with Figures 1 to 3. With the construction 22 of the plug and appropriate positioning of the plug longitudinally, the leading end of the work-piece 12 may be constricted to conform more closely to the plug bar 7 as indicated at 23 in Figure 6, for example. With other constructions of the plug, still being somewhat conical shaped, however, as aforesaid, and in some cases with different longitudinal positioning of the plug, other effects may be achieved. For instance, one other form of hollow which may be produced is shown in Figure 7 wherein the hollow is slightly constricted (at 23) at a position a little short of the leading end and slightly constricted at the back end (at 24). The figures already given represent a satisfactory amount of constriction in many cases.

It is believed that Figure 8, being on a larger scale than the other figures of the drawing, more aptly indicates the nature of the working of the skew rolls on the work-piece 12. As already described, however, the skew rolls are of a different construction in this figure from that shown in Figures 4 and 5 while the plug has different initial and subsequent longitudinal adjustments already mentioned and shown respectively in full and dot-and-dash lines. Otherwise, the operation of the apparatus illustrated by Figure 8 is similar to that described with reference to Figures 4 and 5.

Although the invention has been particularly described in connection with the production of hollows from open-ended work-pieces, it is believed that it will be apparent to those skilled in the art, without further illustration, that the present improvements are applicable to the production of hollows from solid work-pieces. In such cases, of course, the plug would exert a piercing action on the work-pieces. The invention is applicable to the treatment of open-ended work-pieces whether the latter be open at both ends or closed at one end and open at the other. In the latter case, the plug would effect a piercing operation on the closed end to produce the desired hollow as will be understood. Finally, the operations on the work-piece, apart from forming the constrictions, may be of a nature to preserve the external diameter of the work-piece instead of a reduction of that diameter being effected as indicated in the drawings.

What I claim is:

1. A method of producing a tube wherein the leading end of the tube is reduced to a lesser diameter than the tube diameter thereby facilitating introduction of the tube to subsequent mill passes, comprising the steps of positioning a plug mandrel between a pair of reducing rollers in a first position, introducing a tubular workpiece to the action of the rolls and plug until the leading end of the workpiece has passed the plug, moving the plug and workpiece in a direction opposite to the normal movement of the workpiece a short distance to a second position so that the rolls may reduce the leading end of the workpiece behind the plug, at the completion of the reduction moving the plug and workpiece back to their first position and completing the rolling operation.

2. A process according to claim 1 above where the trailing end of a tube is reduced by moving the plug and workpiece to said second position just before the back end of the workpiece passes the plug.

References Cited in the file of this patent

UNITED STATES PATENTS

| | | |
|---|---|---|
| 11,869 | McConnell | Oct. 31, 1854 |
| 1,728,016 | Staples | Sept. 10, 1929 |
| 1,982,544 | Singer | Nov. 27, 1934 |
| 2,228,301 | Ditzel et al. | Jan. 14, 1941 |
| 2,330,556 | Carlson et al. | Sept. 28, 1943 |
| 2,361,619 | Findlater | Oct. 31, 1944 |
| 2,569,104 | Jaenchen | Sept. 25, 1951 |

FOREIGN PATENTS

| | | |
|---|---|---|
| 150,722 | Germany | May 2, 1904 |
| 529,120 | Great Britain | Nov. 14, 1940 |